(12) United States Patent
Kurz

(10) Patent No.: US 10,389,409 B2
(45) Date of Patent: Aug. 20, 2019

(54) COMMUNICATION AND WIRE-FREE ENERGY TRANSMISSION BETWEEN TELECOMMUNICATION TERMINALS

(71) Applicant: Deutsche Telekom AG, Bonn (DE)

(72) Inventor: Michael Kurz, Vienna (AT)

(73) Assignee: DEUTSCHE TELEKOM AG, Bonn (DE)

( * ) Notice: Subject to any disclaimer, the term of this patent is extended or adjusted under 35 U.S.C. 154(b) by 57 days.

(21) Appl. No.: 15/554,718

(22) PCT Filed: Feb. 19, 2016

(86) PCT No.: PCT/EP2016/053583
§ 371 (c)(1),
(2) Date: Aug. 31, 2017

(87) PCT Pub. No.: WO2016/146340
PCT Pub. Date: Sep. 22, 2016

(65) Prior Publication Data
US 2018/0241435 A1    Aug. 23, 2018

(30) Foreign Application Priority Data

Mar. 16, 2015   (DE) .................... 10 2015 204 704

(51) Int. Cl.
*H01M 10/44*    (2006.01)
*H01M 10/46*    (2006.01)
(Continued)

(52) U.S. Cl.
CPC .......... *H04B 5/0037* (2013.01); *H02J 7/0068* (2013.01); *H02J 7/025* (2013.01);
(Continued)

(58) Field of Classification Search
CPC .......... H02J 7/025; H02J 7/355; H02J 7/0042; H02J 7/0026; H02J 7/0011; H02J 7/0004
(Continued)

(56) References Cited

U.S. PATENT DOCUMENTS 9,319,855 B2 * 4/2016 Eaton ...................... H02J 7/025
2011/0221389 A1   9/2011 Won et al.
(Continued)

FOREIGN PATENT DOCUMENTS

WO    WO 2013165165 A1    11/2013

*Primary Examiner* — Edward Tso
(74) *Attorney, Agent, or Firm* — Leydig, Voit & Mayer, Ltd.

(57) ABSTRACT

A method for communication between at least a first telecommunication terminal and a second telecommunication terminal includes: in the event that a charge state of the energy store of the first telecommunication terminal is below a predetermined reference charge state, transmitting a message comprising energy transmission information from the first telecommunication terminal to the second telecommunication terminal, the energy transmission information comprising a request to transmit additional energy to the energy store of the first telecommunication terminal; and increasing the charge state of the energy store of the first telecommunication terminal, or transmitting at least one message between a telecommunication network and the second telecommunication terminal, for the first telecommunication terminal.

11 Claims, 4 Drawing Sheets

(51) Int. Cl.
*H04B 5/00* (2006.01)
*H04W 4/70* (2018.01)
*H02J 50/80* (2016.01)
*H02J 7/00* (2006.01)
*H02J 7/02* (2016.01)
*H04B 5/02* (2006.01)

(52) U.S. Cl.
CPC ............ *H02J 50/80* (2016.02); *H04B 5/0031* (2013.01); *H04B 5/0075* (2013.01); *H04B 5/02* (2013.01); *H04W 4/70* (2018.02)

(58) Field of Classification Search
USPC .......................... 320/107, 108, 114, 115, 116
See application file for complete search history.

(56) References Cited

U.S. PATENT DOCUMENTS

| | | |
|---|---|---|
| 2012/0005497 A1 | 1/2012 | Tsukamoto et al. |
| 2012/0270489 A1 | 10/2012 | Sithes |
| 2014/0156772 A1 | 6/2014 | Eaton |
| 2016/0254688 A1* | 9/2016 | Jung ....................... H02J 7/007 320/164 |

* cited by examiner

300: start
301: charge state below threshold
302: transmit query
303: transmit charge state
304: calculate estimated energy that can be provided
305: check position
306: charging process
307: end charging process
308: end
309: query or request target address
310: response
311: check or comparison
312: communication functionality
313: transmit information

COMMUNICATION AND WIRE-FREE ENERGY TRANSMISSION BETWEEN TELECOMMUNICATION TERMINALS

CROSS-REFERENCE TO RELATED APPLICATIONS

This application is a U.S. National Phase application under 35 U.S.C. § 371 of International Application No. PCT/EP2016/053583, filed on Feb. 19, 2016, and claims benefit to German Patent Application No. DE 10 2015 204 704.0, filed on Mar. 16, 2015. The International Application was published in German on Sep. 22, 2016 as WO 2016/146340 A1 under PCT Article 21(2).

FIELD

The invention relates to a method for communication between at least a first telecommunication terminal and a second telecommunication terminal, the first telecommunication terminal and the second telecommunication terminal each having a wide-area communications interface and a close-range communications interface, the first telecommunication terminal and the second telecommunication terminal each having an energy store for storing electrical energy and each having an energy transmission interface.

The invention also further relates to a telecommunication terminal and to a system comprising a first and second telecommunication terminal for communication between at least one first telecommunication terminal and a second telecommunication terminal, the first telecommunication terminal and the second telecommunication terminal each having a wide-area communications interface and a close-range communications interface, the first telecommunication terminal and the second telecommunication terminal each having an energy store for storing electrical energy and each having an energy transmission interface.

The invention further relates to a computer program comprising program coding and to a computer program product.

BACKGROUND

The importance of data communication between machines has already increased greatly in the past, and is also expected to do so at least in the near future. This has to do in particular with the use of telecommunication terminals that are provided to transmit or to receive data to or from a telecommunication network without user interaction on site (for example via a user interface of the terminal or via control elements such as buttons or the like). Telecommunication terminals or applications of this type are also referred to as machine-to-machine (M2M or MTM) communication. Automated information exchange of terminals such as machines, robots, vehicles or containers with one another or with a central control station, in particular as part of the telecommunication network, is at the forefront here.

M2M solutions are finding increasing acceptance and use in the logistics sector in particular. In this context, telecommunication terminals suitable for or configured for machine-to-machine communication are transported or moved, in some cases over relatively long transport distances, in particular as part of packages or shipment units, data exchange between the telecommunication terminals and a telecommunication network, typically a mobile communication network, being required for tracking and tracing shipments. Machine-to-machine telecommunication terminals are used for example in the field of actively tracking and tracing shipments. in some cases, because the battery capacity of the transported telecommunication terminals is ultimately too low, for example as a result of a comparatively long transport distance or else because of comparatively harsh climate conditions at the point of dispatch and/or during transport and/or at the point of receipt, this results in high failure rates, sometimes to the level of two-digit percentages, in telecommunication terminals of this type, which are unable to last out the distance and/or duration of transport.

SUMMARY

In an exemplary embodiment, the present invention provides a method for communication between at least a first telecommunication terminal and a second telecommunication terminal. The first telecommunication terminal and the second telecommunication terminal each have a wide-area communications interface and a close-range communications interface, the wide-area communications interfaces of the first and second telecommunication terminals being configured for data exchange with a telecommunication network, the close-range communications interfaces of the first and second telecommunication terminals being configured for data exchange between the first and the second telecommunication terminals. The first telecommunication terminal and the second telecommunication terminal each have an energy store for storing electrical energy and each having an energy transmission interface, the energy transmission interfaces of the first and second telecommunication terminals being configured both for transmitting electrical energy to the energy store of the first and/or second telecommunication terminals and for transmitting electrical energy from the energy store of the first and/or second telecommunication terminals. The method includes: in the event that a charge state of the energy store of the first telecommunication terminal is below a predetermined reference charge state, transmitting a message comprising energy transmission information via the close-range communications interface of the first telecommunication terminal and via the close-range communications interface of the second telecommunication terminal from the first telecommunication terminal to the second telecommunication terminal, the energy transmission information comprising a request to transmit additional energy to the energy store of the first telecommunication terminal; and increasing the charge state of the energy store of the first telecommunication terminal via the energy transmission interface of the first telecommunication terminal and via the energy transmission interface of the second telecommunication terminal, or transmitting at least one message between the telecommunication network and the second telecommunication terminal, for the first telecommunication terminal, via the wide-area communications interface of the second telecommunication terminal.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
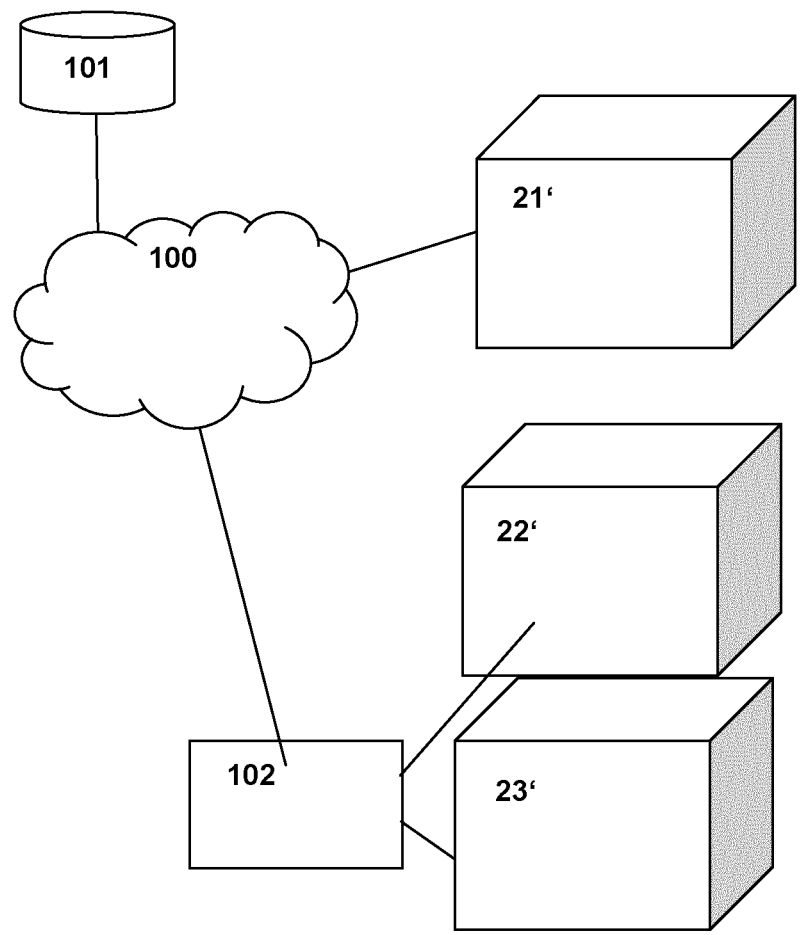
FIG. 1 is a schematic drawing of previously known methods for implementing shipment tracking of packages.

Exemplary embodiments of the invention provide a method for communication between at least a first telecommunication terminal and a second telecommunication terminal, the first telecommunication terminal and the second telecommunication terminal in each case, in addition to a wide-area communications interface, a close-range communications interface, and an energy store for storing electrical energy, also having an energy transmission interface, the energy transmission interface being configured both for transmitting electrical energy to the energy store and for transmitting electrical energy from the energy store, making it possible to reduce the failure rate of telecommunication terminals of this type, in particular in a logistics application of the telecommunication terminals, in which telecommunication terminals of this type are sometimes transported over relatively long transport distances.

In an exemplary embodiment, the invention provides a method for communication between at least a first telecommunication terminal and a second telecommunication terminal, the first telecommunication terminal and the second telecommunication terminal each having a wide-area communications interface and a close-range communications interface, the wide-area communications interfaces of the first and second telecommunication terminals being configured for data exchange with a telecommunication network, the close-range communications interfaces of the first and second telecommunication terminals being configured for data exchange between the first and the second telecommunication terminal, the first telecommunication terminal and the second telecommunication terminal each having an energy store for storing electrical energy and each having an energy transmission interface, the energy transmission interfaces of the first and second telecommunication terminals being configured both for transmitting electrical energy to the energy store of the first and/or second telecommunication terminals and for transmitting electrical energy from the energy store of the first and/or second telecommunication terminal, the method, in the event that a charge state of the energy store of the first telecommunication terminal is below a predetermined reference charge state, having the following steps:

in a first method step, a message comprising energy transmission information is transmitted via the close-range communications interface of the first telecommunication terminal and via the close-range communications interface of the second telecommunication terminal to the second telecommunication terminal, the energy transmission information comprising a request to transmit additional energy to the energy store of the first telecommunication terminal, a second method step subsequent to the first method step or a third method step subsequent to the first method step is carried out, in the second method step the charge state of the energy store of the first telecommunication terminal being increased via the energy transmission interface of the first telecommunication terminal and via the energy transmission interface of the second telecommunication terminal, and in the third method step at least one message being transmitted between the telecommunication network and the second telecommunication terminal, for the first telecommunication terminal, via the wide-area communications interface of the second telecommunication terminal.

Thus, according to the present invention, it is advantageously possible for failures of devices or telecommunication terminals of this type, which in particular occur during transport and can lead to major functional impairments during transport, to the point of a complete breakdown of all communication functionalities of a telecommunication terminal with the telecommunication network, to be reduced in a comparatively simple manner. By contrast with passive methods for tracking shipments, such as the use of bar codes or passive RFID (radiofrequency identification) devices or transponders, the active method according to the invention of tracking shipments makes possible precise tracing of consignment units, for example packages, at least if a telecommunication network, in particular in the form of a mobile communication network, can be reached.

Exemplary embodiments of the present invention solve a problem in the field of machine-to-machine communication, in which typically a large number or plurality of (often identical) telecommunication terminals or machine-to-machine devices (also referred to in the following as MTC devices (machine-type communication devices)) are used to follow or check (in particular in the form of shipment tracking) the transport path of shipment units, such as packages or other elements to be shipped. For data communication, these (machine-to-machine) telecommunication terminals typically use known data communication networks, in particular in the form of second-, third-, fourth- and/or fifth-generation mobile communication networks (2G/GSM (global system for mobile communication), 3G/UMTS (universal mobile telecommunication system), 4G/LTE (long-term evolution)). In particular in the case of relatively long transport distances and/or transport paths in climatically demanding regions (in particular having particularly high and/or low temperatures and/or particularly high air humidity etc.), in conventional systems it is more likely to be possible that the usable energy available, for example in the form of battery charge or rechargeable battery charge in the telecommunication terminal, is insufficient for the relatively long transport distance. In the most extreme case, the communication link with the relevant telecommunication terminal is interrupted or at least disrupted.

The invention therefore advantageously provides that an option for charging the energy store, in particular rechargeable batteries, of telecommunication terminals of this type is provided, and takes place wirelessly, in particular by an inductive principle for implementing the energy charging process or by methods for charging rechargeable batteries using resonance phenomena (inductive charging, resonant charging). As an alternative or in addition to an inductive or resonant charging process, the invention provides that the charging process is optionally based on solar energy, in particular photovoltaics, and/or on a charging process based on movement-induced charging and/or by a charging process based on the piezoelectric effect (piezoelectric charging) and/or by a charging process based on the Seebeck effect (Seebeck electric methods of charging). The invention further provides that the charging process is bidirectional and/or multidirectional, this being in contrast to currently conventional implementation of energy charging processes, in which these energy charging processes only take place in one direction, for example towards the mobile telephone.

In particular in the context of logistics applications, it is often the case that telecommunication terminals are arranged in such a way that a majority of telecommunication terminals are surrounded by other telecommunication terminals, in particular telecommunication terminals of the same or a similar type. This is the case for example if the telecommunication terminals are part of shipment units, for example packages, that are arranged as compactly as possible within a logistics volume, for example a heavy goods vehicle or a container or else within a depot. In a situation of this type (in particular in the case of substantially cuboid external dimensions of the shipment units), a right-angled arrangement is typically advantageous for compact storage, the shipment units generally being arranged relatively close together, in other words being at a small physical distance from one another or (at least in general or for a majority of the shipment units of a predetermined plurality of shipment units) directly adjacent shipment units contacting or touching one another. In a situation of this type, in the event that the energy store in a telecommunication terminal assigned to a shipment unit has an excessively low charge state (below a predetermined reference charge state (either a reference charge state identical for all telecommunication terminals of the plurality of shipment units or else a reference charge state predetermined to be different for different telecommunication terminals (for example as a function of the provided transport distance or the duration of transport)), according to the invention it is advantageously possible for the energy store of this telecommunication terminal to be charged by a charging process by energy transmission from other telecommunication terminals, in particular the directly adjacent telecommunication terminals. According to the invention a special algorithm is used in this context, and provides data exchange between the corresponding telecommunication terminals of the various shipment units. According to the invention, this data exchange, according to the invention in particular in encrypted form, takes place in particular via a short-range communication link between the telecommunication terminals, in particular by a method based on NFC (near-field communication), RFID (radiofrequency identification), Bluetooth, in particular Bluetooth Low Energy, WLAN (wireless local area network), WiMAX or other second-, third or fourth-generation or subsequent-generation radio-based technologies.

The invention provides that a plurality of telecommunication terminals (in particular in the form of machine-to-machine devices and parts of shipment units) are considered. According to the invention, this plurality of telecommunication terminals each have a wide-area communications interface, a close-range communications interface, an energy store for storing electrical energy and an energy transmission interface. In this context, the wide-area communications interfaces of the telecommunication terminals are configured for data exchange with a telecommunication network; the close-range communications interfaces of the telecommunication terminals are configured for data exchange between the telecommunication terminals (in other words with one another), and the energy transmission interfaces of the telecommunication terminals are configured both for transmitting electrical energy to the energy store of one of the telecommunication terminals and for transmitting electrical energy from the energy store of one of the telecommunication terminals. In general, according to the invention this is in each case communication between two telecommunication terminals of the plurality of telecommunication terminals under consideration (which are arranged in particular in a specific physical arrangement), one of the two telecommunication terminals (also referred to in the following as the first telecommunication terminal) tending to have or to detect an excessively low charge state of the energy store thereof, whilst the other of the two telecommunication terminals at least potentially has a sufficient charge state of the energy store thereof. The method according to the invention now provides that, in the event of a charge state of the energy store of the first telecommunication terminal below a predetermined reference charge state, the following steps are carried out.

In a first method step, a message comprising energy transmission information is transmitted via the close-range communications interface of the first telecommunication terminal and via the close-range communications interface of the second telecommunication terminal to the second telecommunication terminal, the energy transmission information comprising a request to transmit additional energy to the energy store of the first telecommunication terminal. This is in particular encrypted data transmission between the first telecommunication terminal and the second telecommunication terminal. According to the invention, this message comprising the energy transmission information in particular comprises a request (to the second telecommunication terminal) to transmit additional energy and/or a request for the second telecommunication terminal to take on energy-consuming functionalities (for example activation or use of the wide-area communications interface) for the first telecommunication terminal. According to the invention, the message transmitted by the first telecommunication terminal in the first method step (and comprising at least the energy transmission information) is in particular in the form of a (dedicated) message specifically directed to the second telecommunication terminal (in particular in the event that the telecommunication terminals (in the present case the first and second telecommunication terminals) have already communicated with one another temporally prior to the transmission of the message comprising the energy transmission information, in other words "know" one another), or else in the form of a broadcast message (to be sent to all telecommunication terminals that can be reached in the context of a given radio signal propagation situation).

According to the invention, after the message transmitted by the first telecommunication terminal in the first method step either a second method step or a third method step is carried out. Whether the second method step or the third method step is carried out (or neither of the two but instead for example a fourth method step) is decided by the second telecommunication terminal (in other words the terminal queries by the message). In the second method step, the charge state of the energy store of the first telecommunication terminal is increased via the energy transmission interface of the first telecommunication terminal and via the energy transmission interface of the second telecommunication terminal, in other words the charge state of the energy store of the first telecommunication terminal is increased at the cost of the charge state of the energy store of the second telecommunication terminal. This is possible for example because it can be predicted that the charge state of the energy store of the second telecommunication terminal (in particular in view of the predicted demands still to be met, for example over a transport distance) is sufficient that the second telecommunication terminal "can afford" to give up part of the energy present in the energy store to the first telecommunication terminal, meaning for example that an advantage can be achieved overall since both terminals are functional for example until the end of a provided transport distance. In the third method step, at least one message is transmitted between the telecommunication network and the second telecommunication terminal, for the first telecommunication terminal, via the wide-area communications interface of the second telecommunication terminal. The third method step thus corresponds to a backup solution in the event that the second telecommunication terminal is unable to transmit energy to the first telecommunication terminal (for example because the charge state is also classified as somewhat insufficient, or else because no excess energy is predicted (in view of the predicted demands still to be met, for example over a transport distance). In a situation of this type, the invention provides that in particular the wide-area communications interface of the second telecommunication terminal is activated with a view to one or more data transmissions to or from the telecommunication network, these data transmissions being carried out by the second telecommunication terminal either exclusively for the first telecommunication terminal or else additionally for the first telecommunication terminal (in other words both for the first and for the second telecommunication terminal). In particular for this second set of circumstances (data transmission both for the first and for the second telecommunication terminal), according to the invention it is advantageously possible to use the energy available in the energy stores of the first and second telecommunication terminals particularly efficiently.

According to the invention, it is preferred for a third telecommunication terminal, in addition to the first telecommunication terminal and the second telecommunication terminal, to have a wide-area communications interface, a close-range communications interface and an energy store for storing electrical energy, the method comprising, in a fourth method step subsequent to the first method step, in particular in the event that neither the second nor the third method step is carried out, a message being transmitted between the telecommunication network and the third telecommunication terminal, for the first telecommunication terminal, via the wide-area communications interface of the third telecommunication terminal.

As a result, according to the invention it is advantageously possible for example for the first telecommunication terminal to query the second telecommunication terminal and, if the second telecommunication terminal does not either establish transmission of electrical energy to the energy store of the first telecommunication terminal in accordance with the second method step or establish wide-area connection to the telecommunication network for the first telecommunication terminal in accordance with the third method step, for at least the wide-area connection to the telecommunication network subsequently (or in parallel) to be established for the first telecommunication terminal via the third telecommunication terminal.

According to the invention, it is further preferred for information exchange between the first and second telecommunication terminals to take place temporally prior to the third method step and/or for information exchange or data exchange between the first and third telecommunication terminals to take place temporally prior to the fourth method step, both the information exchange between the first and second telecommunication terminals and the information exchange between the first and third telecommunication terminals taking place via the relevant close-range communications interfaces of the telecommunication terminals.

As a result, according to the invention it is advantageously possible for a message or a plurality of messages to be exchanged between the first and second telecommunication terminals or between the first and third telecommunication terminals, in particular by a special algorithm. According to the invention, this data exchange, according to the invention in particular in encrypted form, takes place in particular via a short-range communication link between the associated close-range communications interfaces of the relevant telecommunication terminals, in particular by a method based on NFC (near-field communication), RFID (radiofrequency identification), Bluetooth, in particular Bluetooth Low Energy, WLAN (wireless local area network), or WiMAX.

According to the invention, it is further preferred for the charge state of the energy store of the second telecommunication terminal to be increased via the energy transmission interface of the second telecommunication terminal on the one hand and via an energy source or energy transmission interface of a further telecommunication terminal on the other hand, in a fifth method step carried out temporally prior to or during the second method step.

Thus, according to the invention it is advantageously possible that electrical energy can be supplied to a group of telecommunication terminals from the outside.

According to the invention, it is further also preferred for the telecommunication terminals to be positioned in a predetermined physical arrangement relative to one another, in particular on top of one another or side by side, as part of logistical shipment units, transmission of energy to increase the charge state of the energy store of one of the telecommunication terminals in particular taking place between two directly mutually adjacently arranged telecommunication terminals.

As a result, it is advantageously possible according to the invention that the reliability of telecommunication terminals can be increased and in particular that shipment units provided with a telecommunication terminal can be monitored almost continuously and thus gap-free shipment tracing is possible.

Further, according to the invention, it is also preferred for an energy source or an energy transmission interface to be arranged in or on an outer region of the physical arrangement of the shipment units, in a first energy charging step the energy store of the telecommunication terminal arranged directly adjacent to the energy source or energy transmission interface or the energy stores of the telecommunication terminals arranged directly adjacent to the energy source or energy transmission interface being charged, and in a second energy charging step the energy store of the telecommunication terminal arranged next closest to the energy source or energy transmission interface or the energy stores of the telecommunication terminals arranged next closest to the energy source or energy transmission interface being charged.

As a result, according to the invention, it is advantageously possible that additional electrical energy can be supplied in a simple manner to a plurality of telecommunication terminals located in a physical arrangement, without all telecommunication terminals necessarily having to be provided for example with contacts or supply lines or extensive changes having to be made to existing logistics volumes, such as containers or heavy goods vehicle structures; the additional electrical energy (coming from outside the physical arrangement of the telecommunication terminals) can thus still also be made available even to telecommunication terminals that are arranged relatively far away from the energy source or energy transmission interface of the logistics volume.

According to the invention, it is further also preferred for the telecommunication terminals to be positioned in a predetermined physical arrangement relative to one another, in particular on top of one another or side by side, as part of logistical shipment units, the information exchange between the first and second telecommunication terminals taking place temporally prior to the third method step and/or the information exchange between the first and third telecommunication terminals taking place temporally prior to the fourth method step, in particular between two telecommunication terminals that are positioned in the physical vicinity of one another, in particular being arranged directly mutually adjacent, or being arranged directly adjacent in a diagonal direction with respect to the physical arrangement of the shipment units, or being arranged with at most one intermediate layer of shipment units, or being arranged with at most two intermediate layers of shipment units, or being arranged with at most three intermediate layers of shipment units, or being arranged with at most four intermediate layers of shipment units, or being arranged with at most five intermediate layers of shipment units.

Thus, according to the invention, it is advantageously possible for each telecommunication terminal of the predetermined physical arrangement to be able to reach a plurality of other telecommunication terminals via the close-range communications interface.

According to the invention, it is further also preferred for the increase in the charge state of the energy store of the first telecommunication terminal to take place via the respective energy transmission interfaces of the first and second telecommunication terminals by inductive energy transmission and/or by resonant energy transmission.

The present invention further relates to a telecommunication terminal suitable for communication with a second telecommunication terminal, the telecommunication terminal and the second telecommunication terminal each having a wide-area communications interface and a close-range communications interface, the wide-area communications interfaces of the telecommunication terminal and the second telecommunication terminal being configured for data exchange with a telecommunication network, the close-range communications interfaces of the telecommunication terminal and second telecommunication terminal being configured for data exchange between the telecommunication terminal and second telecommunication terminal, the telecommunication terminal and the second telecommunication terminal each having an energy store for storing electrical energy and each having an energy transmission interface, the energy transmission interfaces of the telecommunication terminal and second telecommunication terminal being configured both for transmitting electrical energy to the energy store of the telecommunication terminal and/or second telecommunication terminal and for transmitting electrical energy from the energy store of the telecommunication terminal and/or second telecommunication terminal, the telecommunication terminal being configured in such a way that, in the event that a charge state of the energy store of the telecommunication terminal is below a predetermined reference charge state:

a message comprising energy transmission information is transmitted via the close-range communications interface of the telecommunication terminal and via the close-range communications interface of the second telecommunication terminal to the second telecommunication terminal, the energy transmission information comprising a request to transmit additional energy to the energy store of the telecommunication terminal, and either the charge state of the energy store of the telecommunication terminal is increased via the energy transmission interface of the telecommunication terminal and via the energy transmission interface of the second telecommunication terminal, or at least one message is transmitted between the telecommunication network and the second telecommunication terminal, for the telecommunication terminal, via the wide-area communications interface of the second telecommunication terminal.

Via a telecommunication terminal of this type, according to the invention, it is advantageously possible for the charge state of the energy store present in the telecommunication terminal to take place on the basis of communication with telecommunication terminals located in the surroundings.

The present invention further relates to a telecommunication terminal suitable for communication with a first telecommunication terminal, the telecommunication terminal and the first telecommunication terminal each having a wide-area communications interface and a close-range communications interface, the wide-area communications interfaces of the telecommunication terminal and first telecommunication terminal being configured for data exchange with a telecommunication network, the close-range communications interfaces of the telecommunication terminal and first telecommunication terminal being configured for data exchange between the telecommunication terminal and first telecommunication terminal, the telecommunication terminal and the first telecommunication terminal each having an energy store for storing electrical energy and each having an energy transmission interface, the energy transmission interfaces of the telecommunication terminal and first telecommunication terminal being configured both for transmitting electrical energy to the energy store of the telecommunication terminal and/or first telecommunication terminal and for transmitting electrical energy from the energy store of the telecommunication terminal and/or first telecommunication terminal, the telecommunication terminal being configured in such a way that, in the event that a charge state of the energy store of the first telecommunication terminal is below a predetermined reference charge state:

a message comprising energy transmission information is transmitted via the close-range communications interface of the first telecommunication terminal and via the close-range communications interface of the telecommunication terminal to the telecommunication terminal, the energy transmission information comprising a request to transmit additional energy to the energy store of the first telecommunication terminal, and either the charge state of the energy store of the first telecommunication terminal is increased via the energy transmission interface of the first telecommunication terminal and via the energy transmission interface of the telecommunication terminal, or at least one message is transmitted between the telecommunication network and the telecommunication terminal, for the first telecommunication terminal, via the wide-area communications interface of the telecommunication terminal.

Via a telecommunication terminal of this type, according to the invention, it is advantageously possible that the charge state of the energy store present in the other telecommunication terminal can be increased on the basis of communication with the telecommunication terminal or at least the energy consumption (of the first telecommunication terminal) can be reduced.

The present invention further relates to a system for communication between at least a first telecommunication terminal and a second telecommunication terminal, the system comprising the first telecommunication terminal, the second telecommunication terminal and the telecommunication network, the first telecommunication terminal and the second telecommunication terminal each having a wide-area communications interface and a close-range communications interface, the wide-area communications interfaces of the first and second telecommunication terminals being configured for data exchange with a telecommunication network, the close-range communications interfaces of the first and second telecommunication terminals being configured for data exchange between the first and the second telecommunication terminal, the first telecommunication terminal and the second telecommunication terminal each having an energy store for storing electrical energy and each having an energy transmission interface, the energy transmission interfaces of the first and second telecommunication terminals being configured both for transmitting electrical energy to the energy store of the first and/or second telecommunication terminals and for transmitting electrical energy from the energy store of the first and/or second telecommunication terminals, the system being configured in such a way that, in the event that a charge state of the energy store of the first telecommunication terminal is below a predetermined reference charge state:

a message comprising energy transmission information is transmitted via the close-range communications interface of the first telecommunication terminal and via the close-range communications interface of the second telecommunication terminal to the second telecommunication terminal, the energy transmission information comprising a request to transmit additional energy to the energy store of the first telecommunication terminal, and either the charge state of the energy store of the first telecommunication terminal is increased via the energy transmission interface of the first telecommunication terminal and via the energy transmission interface of the second telecommunication terminal, or at least one message is transmitted between the telecommunication network and the second telecommunication terminal, for the first telecommunication terminal, via the wide-area communications interface of the second telecommunication terminal.

Via a system of this type, according to the invention, it is advantageously possible that the relative number of failures of telecommunication terminals of this type can be greatly reduced.

The present invention further also relates to a computer program comprising program coding via which the steps of the method according to the invention can be carried out when the computer program is executed on a programmable device, in particular as part of the system, or on the first or second telecommunication terminal.

The present invention further relates to a computer program product comprising a computer-readable medium and a computer program stored on the computer-readable medium and comprising program coding, which are suitable for the steps of the method according to the invention to be able to be carried out when the computer program is executed on a programmable device, in particular as part of the system, or on the first or second telecommunication terminal.

Further details, features and advantages of the invention are apparent from the drawings and from the following description of preferred embodiments with reference to the drawings. The drawings merely illustrate example embodiments of the invention, which do not limit the essential ideas of the invention.

The present invention is described with reference to particular embodiments and with reference to the accompanying drawings; however, the invention is not limited to these embodiments and these drawings, but rather is determined by the claims. The drawings are not limiting. In the drawings, elements intended for illustrative purposes may be shown enlarged or exaggerated and not to scale.

Unless specifically stated otherwise, the use of an indefinite or definite article in relation to a word in the singular, for example "a", "an", "the", also includes the plural of this word. The terms, "first", "second" and so forth in the description and claims are used to differentiate between similar elements or between like elements that are to be distinguished, and not necessarily to describe a temporal or other sequence. The terms used in this manner are in principle to be treated as exchangeable under appropriate conditions.

FIG. 1 is a schematic drawing of methods known thus far via which shipment tracking of packages can be implemented. A first package 21', which for example has a telecommunication terminal in the form of a machine-to-machine device having a wide-area communications interface, can thus be traced on the transport path thereof, in that a connection to the telecommunication network 100 or from the telecommunication network 100 to the telecommunication terminal is established via the wide-area communications interface. Naturally, for carrying out the shipment tracking, there is network coverage by the telecommunication network 100 or a roaming agreement is applicable at the location of the first package 21'. A second package 22' has for example an active RFID element, in particular an RFID transponder, the RFID element being capable of communicating with a scanner unit 102, which in turn has or provides the option of data exchange with the telecommunication network 100, in particular via a wide-area communications interface. Further, a third package 23' has a passive RFID element and/or a bar code, in such a way that information can likewise be transmitted to the telecommunication network 100 via a connection to the scanner unit 102.

The telecommunication network 100 has in particular or is assigned an AAA server or M2M server 101, the AAA server or M2M server 101 having a database in which for example information on the authorization of telecommunication terminals is present.

The second and third packages 22', 23' that do not have a wide-area communications interface cannot be tracked globally (at least, not without the presence of the scanner unit 102 and thus also not without human interaction). The second and third packages 22', 23' can only be tracked at particular points (known as centers or hubs), by scanning the second or third package 22', 23'.

Figure 2:
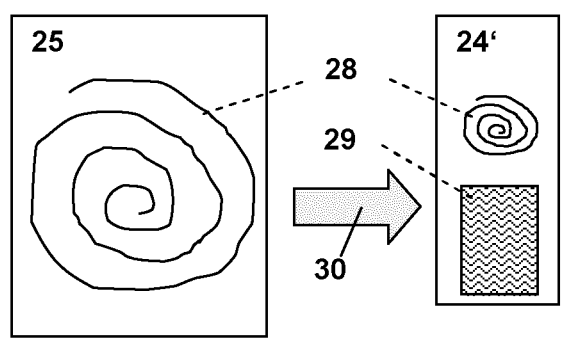
FIG. 2 is a schematic drawing of conventionally known methods for charging energy stores with electrical energy.

FIG. 2 schematically shows a conventionally known method for charging energy stores with electrical energy. An electrical and/or electronic device 24', for example a telecommunication terminal and/or a machine-to-machine device, comprises an energy store 29 and an energy transmission interface. Via a charging device 25, the energy store 29 of the electrical and/or electronic device 24' can be charged with electrical energy via a further energy transmission interface (of the charging device 25). For this purpose, typically, the transmission interfaces have at least one coil 28. The energy flow from the charging device 25 to the electrical and/or electronic device 24 is represented schematically in FIG. 2 by an arrow and the reference numeral 30. The energy transmission is conventionally provided in particular in such a way that the interaction of the two energy transmission interfaces is based on an inductive process or inductive interaction (inductive charging) and/or in that the interaction of the two energy transmission interfaces is based on a resonance phenomenon (resonant charging).

Figure 3:
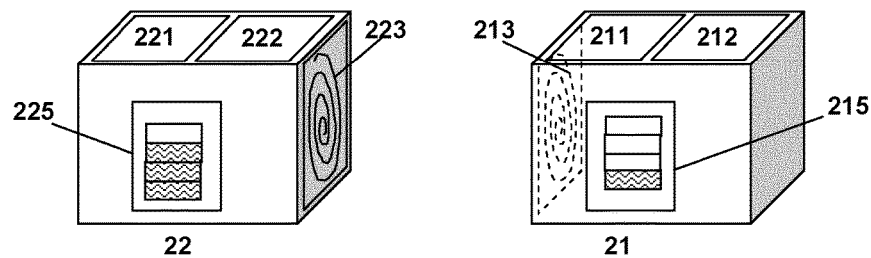
FIG. 3 schematically shows a first and second telecommunication terminal according to the invention, each having a wide-area communications interface, a close-range communications interface, an energy store and an energy transmission interface.

FIG. 3 schematically shows a first and a second telecommunication terminal 21, 22 according to the invention, each having a wide-area communications interface, a close-range communications interface, an energy store and an energy transmission interface.

Figure 4:
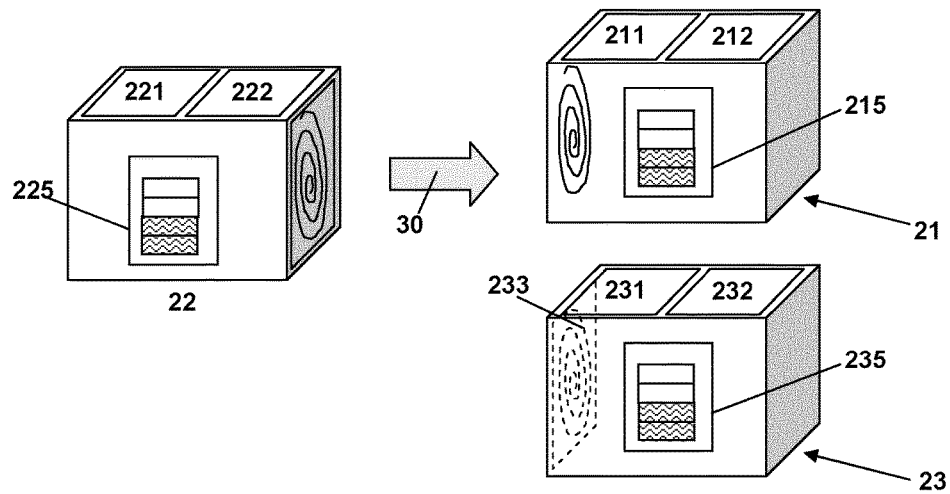
FIG. 4 schematically shows the first and second telecommunication terminal according to the invention and a third telecommunication terminal, each having the wide-area communications interface, the close-range communications interface, the energy store and the energy transmission interface, a charging process of the first telecommunication terminal by way of the second telecommunication terminal being shown.

FIG. 4 schematically shows the first and second telecommunication terminals 21, 22 according to the invention and a third telecommunication terminal 23. A charging process of the first telecommunication terminal 21 via the second telecommunication terminal 22 is represented schematically by an arrow and the reference numeral 30.

In FIGS. 3 and 4, the telecommunication terminals 21, 22, 23 each have a wide-area communications interface, a close-range communications interface, an energy store and an energy transmission interface. The first telecommunication terminal 21 has a first wide-area communications interface 211, a first close-range communications interface 212, a first energy store 215 and a first energy transmission interface 213; the second telecommunication terminal 22 has a second wide-area communications interface 221, a second close-range communications interface 222, a second energy store 225 and a second energy transmission interface 223; the third telecommunication terminal 23 has a third wide-area communications interface 231, a third close-range communications interface 232, a third energy store 235 and a third energy transmission interface 233.

The present invention provides that in a plurality of telecommunication terminals 21, 22, 23 under consideration (or of shipment units having the telecommunication terminals) the proportion of said telecommunication terminals that cannot perform the functionality thereof as a result of excessively low rechargeable battery capacity is reduced. This is brought about according to the invention by implementing a cooperative behavior of the telecommunication terminals; in other words, when the first telecommunication terminal 21 establishes that the (first) energy store 215 is insufficiently charged (in other words has a charge state below a predetermined reference charge state), in a first method step a message comprising energy transmission information is transmitted via the (first) close-range communications interface 212 and via the (second) close-range communications interface 222 to the second telecommunication terminal 22 (and/or to a further telecommunication terminal, for example to the third telecommunication terminal 23), the energy transmission information comprising a request to transmit additional energy to the (first) energy store 215. Subsequent to the first method step, either a second method step or a third method step is carried out. According to the invention, it is preferably also provided that subsequent to the first method step either the second method step or the third method step or a fourth method step is carried out. In the second method step, the charge state of the (first) energy store 215 is increased via the (first) energy transmission interface 213 (of the first telecommunication terminal 21) and via the (second) energy transmission interface 223 (of the second telecommunication terminal 22). In the third method step, at least one message is transmitted between the telecommunication network 100 and the second telecommunication terminal 22, for the first telecommunication terminal 21, via the (second) wide-area communications interface 221 (of the second telecommunication terminal 22). In the fourth method step, in particular in the event that neither the second nor the third method step is carried out, at least one message is transmitted between the telecommunication network 100 and the third telecommunication terminal 123, for the first telecommunication terminal 21, via the (third) wide-area communications interface 231 (of the third telecommunication terminal 23).

In a variant embodiment, according to the invention, it is provided that the message comprising the energy transmission information that is transmitted to the second telecommunication terminal 22 (by the first telecommunication terminal 21) in the first method step has also been transmitted to the third telecommunication terminal 23 or received by the third telecommunication terminal 23. As an alternative to a variant embodiment of this type, according to the invention, it is provided that the message transmitted to the second telecommunication terminal 22 (by the first telecommunication terminal 21) in the first method step either is not transmitted to the third telecommunication terminal 23 or is not received by the third telecommunication terminal 23, and that via a further message (from the first telecommunication terminal 21 to the third telecommunication terminal 23) comprising the energy transmission information (or further energy transmission information) it is provided that the fourth method step is carried out.

The invention provides a new type of multidimensional wireless charging of an energy store of a telecommunication terminal, in particular a machine-to-machine device, the telecommunication terminal typically being connected to a mobile communication network (in particular second- and/or third- and/or fourth-generation and/or another generation). In the type of charging of the energy store according to the invention, a process of inductive and/or resonant charging (in particular via coils) by a predefined method is used, and is shown schematically in FIG. 10 and described in greater detail below.

Figure 5:
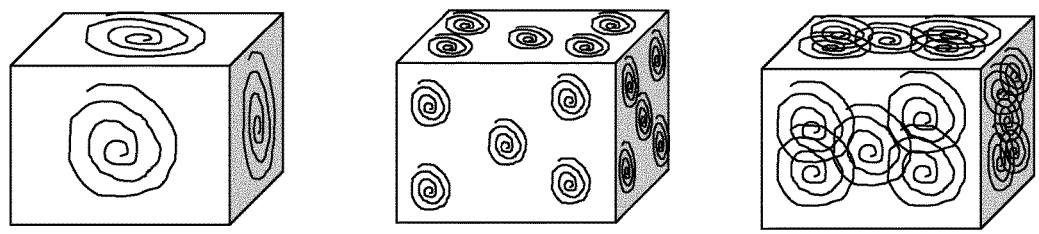
FIG. 5 schematically shows a plurality of telecommunication terminals having different configurations of energy transmission interfaces or having different configurations of coils that are part of the energy transmission interfaces.

FIG. 5 schematically shows a plurality of telecommunication terminals, the telecommunication terminals having various configurations of energy transmission interfaces or various configurations of coils that are part of the energy transmission interfaces. In particular, it may be provided that a telecommunication terminal merely has one coil or else has a plurality of coils, but merely one coil on one side face, or else has a plurality of coils on one or more side faces.

Figure 6:
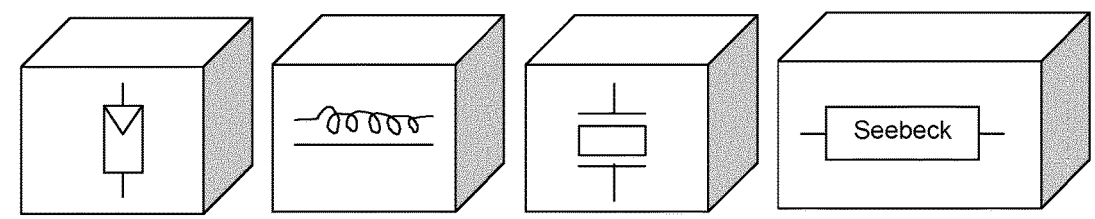
FIG. 6 schematically shows a plurality of telecommunication terminals having different configurations of energy transmission interfaces based on different methods for charging the energy store.

FIG. 6 schematically shows a plurality of telecommunication terminals having different configurations of energy transmission interfaces, the different energy transmission interfaces being based on different methods for charging energy stores, for example based on the use of solar energy, in particular photovoltaics (image at far left in FIG. 6) or based on the use of electromagnetic induction (image at center left in FIG. 6) or based on the use of the piezoelectric effect (or of piezo energy) (image at center right in FIG. 6) or based on the use of the Seebeck effect (image at far right in FIG. 6).

Figure 7:
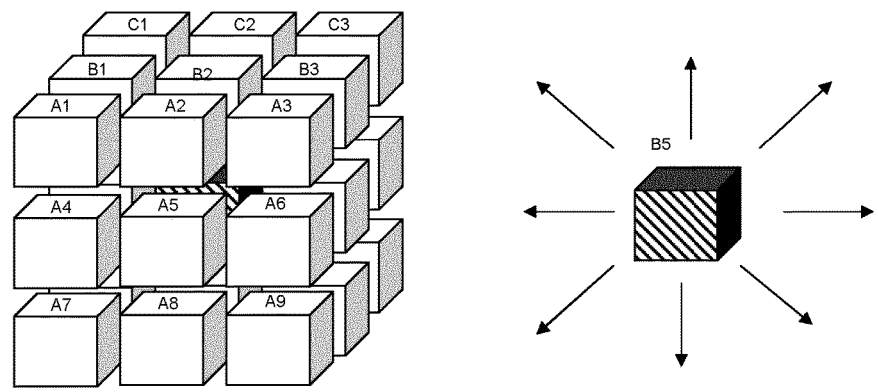
FIGS. 7 and 8 schematically show physical arrangements of a plurality of telecommunication terminals or plurality of shipment units, one of the telecommunication terminals at least potentially being capable of obtaining energy from a plurality of other telecommunication terminals.
Figure 8:
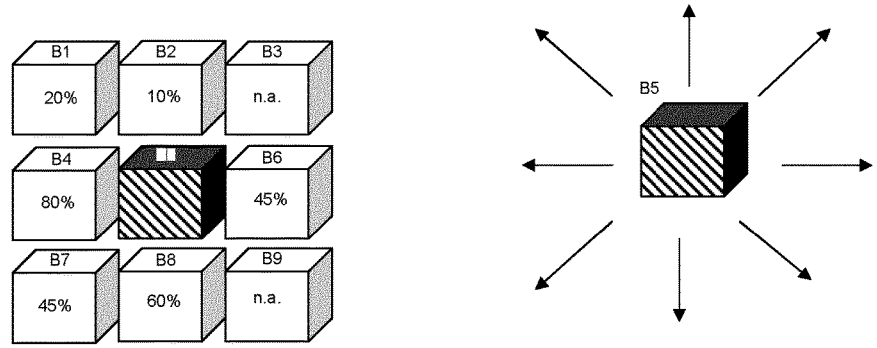

FIGS. 7 and 8 schematically show physical arrangements of a plurality of telecommunication terminals or plurality of shipment units, one of the telecommunication terminals at least potentially being capable of obtaining energy from a plurality of other telecommunication terminals. The physical arrangement of the telecommunication terminals in FIG. 8 (in other words in a two-dimensional arrangement) corresponds to a situation simplified from the arrangement in FIG. 7. This means that the entire process to be described in greater detail below (in particular comprising the steps of searching, initiating, authorizing, charging process, messaging) takes place in a physical relationship between the machine-to-machine devices or telecommunication terminals. FIG. 7 schematically shows a three-dimensional physical arrangement. In a first plane (shown closer to the viewer), a number of shipment units, which according to the invention each have a telecommunication terminal, are denoted by references A1, A2, A3, A4, A5, A6, A7, A8 and A9. In a central plane, a number of shipment units are denoted by references B1, B2, B3, B4, B5, B6, B7, B8 and B9, although references B4 to B9 are not visible. In a rear plane (shown located further away from the viewer), a number of shipment units are denoted by references C1, C2, C3, C4, C5, C6, C7, C8 and C9, although references C4 to C9 are not visible. In the right-hand part of FIG. 7, the shipment unit B5 and a plurality of possible directions or connections for transmitting electrical energy are schematically shown. FIG. 8 schematically shows a two-dimensional physical arrangement (for example as a detail of the arrangement of FIG. 7), in FIG. 8 by way of example the central plane, in other words the shipment units B1, B2, B3, B4, B5, B6, B7, B8 and B9, being shown, and for each of the shipment units the charge state of the energy store also being schematically indicated, by way of example 20% for B1, 10% for B2, 80% for B4, 45% for B6, 45% for B7, 60% for B8. There are no specifications for B3 and B9, meaning that the charge state could not be determined during the communication between the shipment unit B5 (or the telecommunication terminal connected to said shipment unit) and the neighboring elements.

Figure 9:
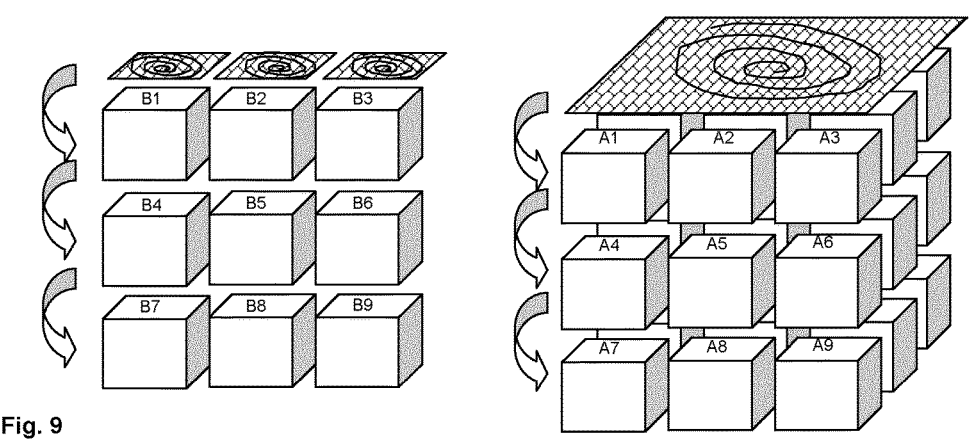
FIG. 9 schematically shows a plurality of physical arrangements of a plurality of telecommunication terminals or plurality of shipment units, an energy source external to the physical arrangement successively leading to the respective energy stores of the various telecommunication terminals being charged.

FIG. 9 schematically shows a plurality of physical arrangements of a plurality of telecommunication terminals or plurality of shipment units, an energy source external to the physical arrangement successively leading to the respective energy stores of the various telecommunication terminals being charged. By way of example, solar panels (in particular photovoltaic panels) are schematically shown in the upper part of each of the two arrangements shown (on the left and right of FIG. 9), a plurality of solar panels that are each adapted in size to an individual shipment unit being shown in the arrangement shown on the left side of FIG. 9. In the arrangement shown on the right side of FIG. 9, one larger solar panel is provided. All of the solar panels shown in the upper part of FIG. 9 are shown with a spiral, to indicate that, within the meaning of an energy transmission interface, a coil is provided for transmitting electrical energy to the associated energy stores, in particular the shipment units respectively arranged adjacent to the solar panels or the associated telecommunication terminals of said units. The arrows further shown in FIG. 9 (on the left side of each of the two arrangements) are intended to indicate that the transmission of electrical energy between the shipment units or energy stores of the associated telecommunication terminals progresses downward (with respect to the physical arrangement of shipment units).

Figure 10:
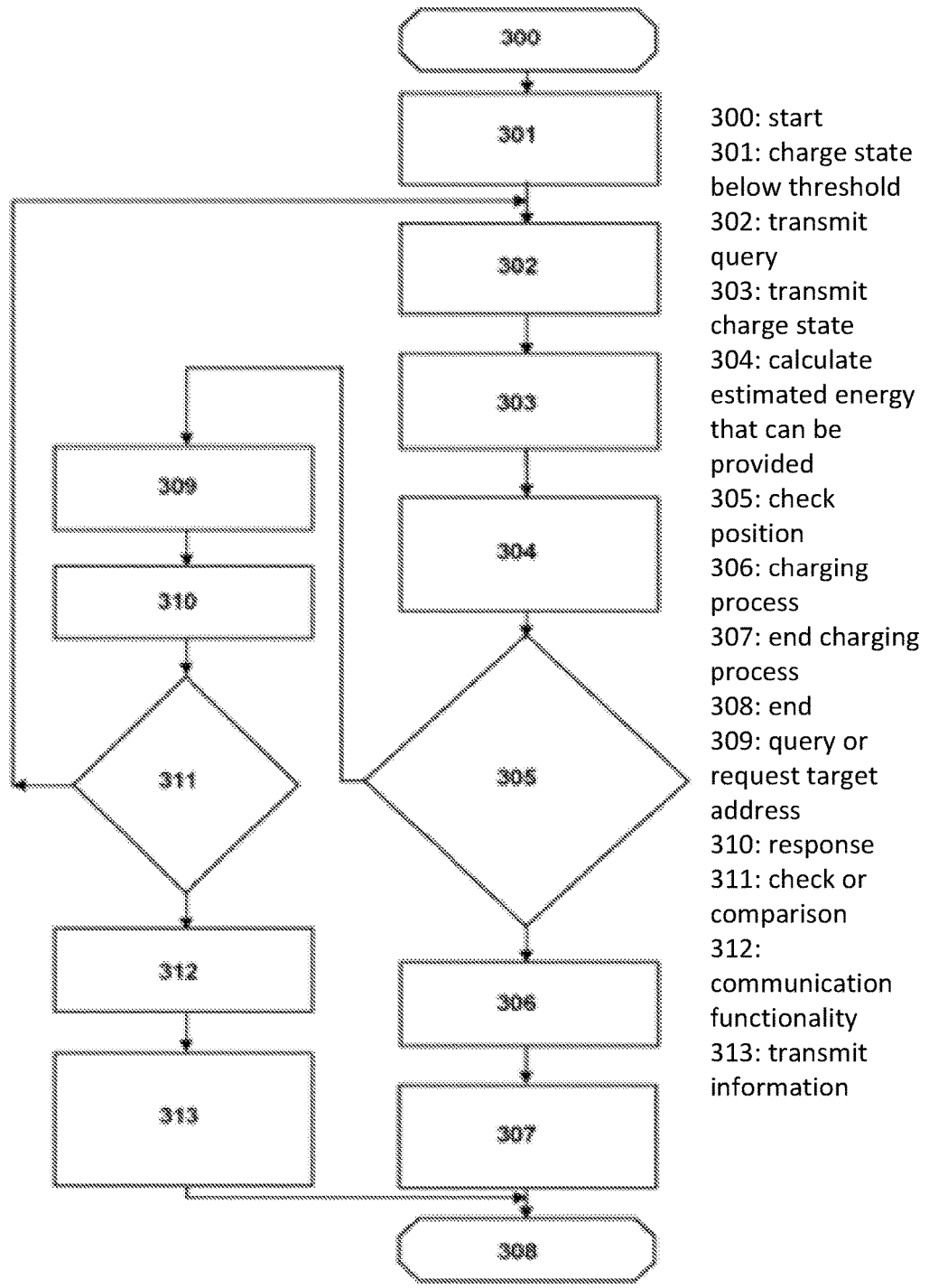
FIG. 10 is a schematic flow chart of an embodiment of the method according to the invention.

FIG. 10 is a schematic flow chart of an embodiment of the method according to the invention. The method starts with an initial process step 300, and subsequently passes to a first process step 301. In the first process step 301, it is established that the (first) energy store 215 of the first telecommunication terminal 21 (or B5) has a charge state below a predetermined reference charge state (for example 5% of the total charge capacity of the (first) energy store 215, or else 10% or 15% or 20%). Subsequently, the method passes to a second process step 302. In the second process step 302, the telecommunication terminal affected by a low charge state of the energy store thereof (in the case under consideration, the first telecommunication terminal 21 or B5) transmits a query, in particular in the form of a message, to other telecommunication terminals (B1-B4, B6-B9). The query or message comprises energy transmission information or comprises an indication that information regarding the charge state of the relevant energy store (of the typically a plurality of telecommunication terminals B1-B4, B6-B9 that receive the message) is to be transmitted to the relevant (in this case the first) telecommunication terminal 21 (or B5). Subsequently, the method passes to a third process step 303. In the third process step 303, the telecommunication terminals 22, 23 (or B1-B4, B6-B9) queried in the second process step 302 transmit the current charge state of the energy store thereof, for example the fact that the energy store of the second telecommunication terminal (or B4) is still 80% charged. Subsequently, the method passes to a fourth process step 304. In the fourth process step 304, the estimated energy that can be provided by each of the involved or queried telecommunication terminals 22, 23 (or B1-B4, B6-B9) or by the first telecommunication terminal 21 (or B5) is calculated. Subsequently, the method passes to a fifth process step 305. In the fifth process step 305, it is checked whether two telecommunication terminals (in the present case the second telecommunication terminal 22 and the first telecommunication terminal 21) are positioned sufficiently close together that a charging process can be carried out by a wireless charging method. If this check has a positive result, the method subsequently passes to a sixth process step 306. If this check has a negative result, the method subsequently passes to a ninth process step 309. In the sixth process step 306, the charging process is carried out by wireless transmission of electrical energy from the (for example) second telecommunication terminal 22 (or B1-B4, B6-B9) to the first telecommunication terminal 21. Subsequently, the method passes to a seventh process step 307. In the seventh process step 307, the charging process is ended upon meeting a discontinuation criterion (for example the previously agreed amount of electrical energy having been transmitted to the first telecommunication terminal 21). Subsequently, the method passes to an eighth process step 308. In the eighth process step 308, the method is ended. In the ninth process step 309, the target address of the second telecommunication terminal 22 (or B1-B4, B6-B9) is queried or requested (by the first telecommunication terminal 21). Subsequently, the method passes to a tenth process step 310. In the tenth process step 310, the response of the second telecommunication terminal 22 or the responses of the telecommunication terminals B1-B4, B6-B9 are transmitted to the first telecommunication terminal 21. Subsequently, the method passes to an eleventh process step 311. In the eleventh process step 311, it is checked or compared whether a telecommunication terminal or a plurality of the telecommunication terminals have the same target or same target address as the first telecommunication terminal 21. If this check has a positive result, the method subsequently passes to a twelfth process step 312. If this check has a negative result, the method subsequently passes to the second process step 302. In the twelfth process step 312, at least part of the communication functionality of the first telecommunication terminal 21 is performed by the second telecommunication terminal 22 (or by the telecommunication terminals B1-B4, B6-B9), in other words at least one message is transmitted between the telecommunication network 100 and the second telecommunication terminal 22, for the first telecommunication terminal 21, via the wide-area communications interface 221 of the second telecommunication terminal 22. Subsequently, the method passes to a thirteenth process step 313. In the thirteenth process step 313, the first telecommunication terminal 21 and/or the second telecommunication terminal 22 (or a further telecommunication terminal) transmit the information to the shipment tracking system (machine-to-machine server (M2M server)) via the shared target address. Subsequently, the method passes to the eighth process step 308.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for communication between at least a first telecommunication terminal and a second telecommunication terminal, the first telecommunication terminal and the second telecommunication terminal each having a wide-area communications interface and a close-range communications interface, the wide-area communications interfaces of the first and second telecommunication terminals being configured for data exchange with a telecommunication network, the close-range communications interfaces of the first and second telecommunication terminals being configured for data exchange between the first and the second telecommunication terminals, the first telecommunication terminal and the second telecommunication terminal each having an energy store for storing electrical energy and each having an energy transmission interface, the energy transmission interfaces of the first and second telecommunication terminals being configured both for transmitting electrical energy to the energy store of the first and/or second telecommunication terminals and for transmitting electrical energy from the energy store of the first and/or second telecommunication terminals, the method comprising:

in the event that a charge state of the energy store of the first telecommunication terminal is below a predetermined reference charge state, transmitting a message comprising energy transmission information via the close-range communications interface of the first telecommunication terminal and via the close-range communications interface of the second telecommunication terminal from the first telecommunication terminal to the second telecommunication terminal, the energy transmission information comprising a request to transmit additional energy to the energy store of the first telecommunication terminal; and increasing the charge state of the energy store of the first telecommunication terminal via the energy transmission interface of the first telecommunication terminal and via the energy transmission interface of the second telecommunication terminal, or transmitting at least one message between the telecommunication network and the second telecommunication terminal, for the first telecommunication terminal, via the wide-area communications interface of the second telecommunication terminal;

wherein the first and second telecommunication terminals are positioned in a predetermined physical arrangement relative to one another as part of a physical arrangement of shipment units.

2. The method according to claim 1, wherein an information exchange between the first and second telecommunication terminals takes place via the close-range communications interfaces of the first and second telecommunication terminals.

3. The method according to claim 1, wherein the charge state of the energy store of the second telecommunication terminal is increased via the energy transmission interface of the second telecommunication terminal and via an energy source or energy transmission interface of a further telecommunication terminal.

4. The method according to claim 1, wherein the first and second telecommunication terminals are positioned on top of one another or side by side.

5. The method according to claim 1, wherein an energy source or an energy transmission interface is arranged in or on an outer region of the physical arrangement of shipment units, wherein in a first energy charging step one or more energy stores of one or more telecommunication terminals arranged directly adjacent to the energy source or energy transmission interface are charged, and in a second energy charging step one or more energy stores of one or more telecommunication terminals arranged next closest to the energy source or energy transmission interface are charged.

6. The method according to claim 1,
wherein the first and second telecommunication terminals are arranged in at least one of the following configurations:
directly mutually adjacent; or
directly adjacent in a diagonal direction with respect to the physical arrangement of the shipment units; or
with at most one intermediate layer of shipment units; or
with at most two intermediate layers of shipment units; or
with at most three intermediate layers of shipment units; or
with at most four intermediate layers of shipment units; or
with at most five intermediate layers of shipment units.

7. The method according to claim 1, wherein the increase in the charge state of the energy store of the first telecommunication terminal takes place via the respective energy transmission interfaces of the first and second telecommunication terminals by inductive energy transmission and/or by resonant energy transmission.

8. A telecommunication terminal for communication with a second telecommunication terminal, the telecommunication terminal comprising:
a wide-area communications interface, configured for data exchange with a telecommunication network;
a close-range communications interface, configured for data exchange with a close-range communications interface of the second telecommunication terminal;
an energy store for storing electrical energy; and
an energy transmission interface, configured both for transmitting electrical energy to the energy store of the telecommunication terminal and/or second telecommunication terminal and for transmitting electrical energy from the energy store of the telecommunication terminal and/or second telecommunication terminal;
wherein the close-range communication interface of the telecommunication terminal is configured to transmit a message comprising energy transmission information to the second telecommunication terminal in the event that a charge state of the energy store of the telecommunication terminal is below a predetermined reference charge state, the energy transmission information comprising a request to transmit additional energy to the energy store of the telecommunication terminal; and
wherein the energy store of the telecommunication terminal is configured to have its charge state increased via the energy transmission interface of the telecommunication terminal;
wherein the telecommunication terminal and the second telecommunication terminal are positioned in a predetermined physical arrangement relative to one another as part of a physical arrangement of shipment units.

9. A telecommunication terminal for communication with a first telecommunication terminal, the telecommunication terminal comprising:
a wide-area communications interface, configured for data exchange with a telecommunication network;
a close-range communications interface, configured for data exchange with the first telecommunication terminal;
an energy store for storing electrical energy; and
an energy transmission interface, configured both for transmitting electrical energy to the energy store of the telecommunication terminal and/or the first telecommunication terminal and for transmitting electrical energy from the energy store of the telecommunication terminal and/or first telecommunication terminal;
wherein the close-range communication interface is configured to receive a message comprising energy transmission information from the first telecommunication terminal in the event that a charge state of the energy store of the first telecommunication terminal is below a predetermined reference charge state, the energy transmission information comprising a request to transmit additional energy to the energy store of the first telecommunication terminal; and
wherein the energy transmission interface is configured to increase the charge state of the energy store of the first telecommunication terminal, or the wide-area communications interface is configured to transmit at least one message for the first telecommunication terminal between the telecommunication network and the telecommunication terminal;
wherein the telecommunication terminal and the first telecommunication terminal are positioned in a predetermined physical arrangement relative to one another as part of a physical arrangement of shipment units.

10. A system for communication between at least a first telecommunication terminal and a second telecommunication terminal, the system comprising:
the first telecommunication terminal;
the second telecommunication terminal; and
a telecommunication network;
wherein the first telecommunication terminal and the second telecommunication terminal each have a wide-area communications interface and a close-range communications interface, the wide-area communications interfaces of the first and second telecommunication terminals being configured for data exchange with the telecommunication network, the close-range communications interfaces of the first and second telecommunication terminals being configured for data exchange between the first and the second telecommunication terminal;
wherein the first telecommunication terminal and the second telecommunication terminal each have an energy store for storing electrical energy and each have an energy transmission interface, the energy transmission interfaces of the first and second telecommunication terminals being configured both for transmitting electrical energy to the energy store of the first and/or second telecommunication terminals and for transmitting electrical energy from the energy store of the first and/or second telecommunication terminals;

wherein the first telecommunication terminal is configured to transmit, in the event that a charge state of the energy store of the first telecommunication terminal is below a predetermined reference charge state, a message comprising energy transmission information to the second telecommunication terminal via the close-range communications interface of the first telecommunication terminal and via the close-range communications interface of the second telecommunication terminal to the second telecommunication terminal, the energy transmission information comprising a request to transmit additional energy to the energy store of the first telecommunication terminal; and wherein the first telecommunication terminal is configured to have the charge state of the energy store of the first telecommunication terminal increased via the energy transmission interface of the first telecommunication terminal and via the energy transmission interface of the second telecommunication terminal, or wherein the second telecommunication terminal is configured to transmit at least one message between the telecommunication network and the second telecommunication terminal, for the first telecommunication terminal, via the wide-area communications interface of the second telecommunication terminal;

wherein the first and second telecommunication terminals are positioned in a predetermined physical arrangement relative to one another as part of a physical arrangement of shipment units.

11. A non-transitory computer-readable medium having processor-executable instructions stored thereon for communication between at least a first telecommunication terminal and a second telecommunication terminal, the first telecommunication terminal and the second telecommunication terminal each having a wide-area communications interface and a close-range communications interface, the wide-area communications interfaces of the first and second telecommunication terminals being configured for data exchange with a telecommunication network, the close-range communications interfaces of the first and second telecommunication terminals being configured for data exchange between the first and the second telecommunication terminals, the first telecommunication terminal and the second telecommunication terminal each having an energy store for storing electrical energy and each having an energy transmission interface, the energy transmission interfaces of the first and second telecommunication terminals being configured both for transmitting electrical energy to the energy store of the first and/or second telecommunication terminals and for transmitting electrical energy from the energy store of the first and/or second telecommunication terminals, the processor-executable instructions, when executed, facilitating performance of the following:

in the event that a charge state of the energy store of the first telecommunication terminal is below a predetermined reference charge state, transmitting a message comprising energy transmission information via the close-range communications interface of the first telecommunication terminal and via the close-range communications interface of the second telecommunication terminal from the first telecommunication terminal to the second telecommunication terminal, the energy transmission information comprising a request to transmit additional energy to the energy store of the first telecommunication terminal; and increasing the charge state of the energy store of the first telecommunication terminal via the energy transmission interface of the first telecommunication terminal and via the energy transmission interface of the second telecommunication terminal, or transmitting at least one message between the telecommunication network and the second telecommunication terminal, for the first telecommunication terminal, via the wide-area communications interface of the second telecommunication terminal;

wherein the first and second telecommunication terminals are positioned in a predetermined physical arrangement relative to one another as part of a physical arrangement of shipment units.

* * * * *